United States Patent
Song

(10) Patent No.: US 10,203,552 B2
(45) Date of Patent: Feb. 12, 2019

(54) RUBBER FRAME AND MANUFACTURING METHOD THEREOF, BACKLIGHT MODULE, AND DISPLAY DEVICE AND ASSEMBLING METHOD THEREOF

(71) Applicants: BOE Technology Group Co., Ltd., Beijing (CN); Beijing BOE Optoelectronics Technology Co., Ltd., Beijing (CN)

(72) Inventor: Yong Song, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 29 days.

(21) Appl. No.: 15/511,913

(22) PCT Filed: Aug. 1, 2016

(86) PCT No.: PCT/CN2016/092700
§ 371 (c)(1),
(2) Date: Mar. 16, 2017

(87) PCT Pub. No.: WO2017/117992
PCT Pub. Date: Jul. 13, 2017

(65) Prior Publication Data
US 2018/0231841 A1    Aug. 16, 2018

(30) Foreign Application Priority Data
Jan. 5, 2016 (CN) .......................... 2016 1 0006101

(51) Int. Cl.
*H05K 5/00* (2006.01)
*G02F 1/1335* (2006.01)
(Continued)

(52) U.S. Cl.
CPC .......... *G02F 1/133608* (2013.01); *G02F 1/13* (2013.01); *G02F 1/1333* (2013.01);
(Continued)

(58) Field of Classification Search
CPC .................................................. G02F 1/13357
(Continued)

(56) References Cited

U.S. PATENT DOCUMENTS

2013/0141665 A1* 6/2013 Huang .............. G02F 1/133308
349/60

FOREIGN PATENT DOCUMENTS

| CN | 1979277 A | 6/2007 |
|---|---|---|
| CN | 204086747 U | 1/2015 |

(Continued)

OTHER PUBLICATIONS

Nov. 3, 2016—(WO) International Search Report and Written Opinion Appn PCT/CN2016/092700 with English Tran.

*Primary Examiner* — Jerry Wu
(74) *Attorney, Agent, or Firm* — Banner & Witcoff, Ltd.

(57) ABSTRACT

A rubber frame, a manufacturing method thereof, a backlight module, a display device and an assembling method thereof, for solving the problem that breakage is prone to occur at a position with single-layer glass. The rubber frame includes a rubber frame body and a protective structure member providing cushioning effect, the protective structure member is in a shape of sheet and made of a same material as that of the rubber frame body, and is used in mutual cooperation with the rubber frame body within a bonding region of the rubber frame body.

15 Claims, 3 Drawing Sheets

(51) Int. Cl.
*G02F 1/13* (2006.01)
*G02F 1/1333* (2006.01)
*G02F 1/1339* (2006.01)

(52) U.S. Cl.
CPC ........ *G02F 1/1339* (2013.01); *G02F 1/13338* (2013.01); *G02F 1/133308* (2013.01); *G02F 2001/133325* (2013.01)

(58) Field of Classification Search
USPC .................................................. 361/679.01
See application file for complete search history.

(56) References Cited

FOREIGN PATENT DOCUMENTS

| | | |
|---|---|---|
| CN | 104460120 A | 3/2015 |
| CN | 204422909 U | 6/2015 |
| CN | 204667014 U | 9/2015 |
| CN | 105425448 A | 3/2016 |
| JP | 2001154802 A | 6/2001 |
| JP | 2010217357 A | 9/2010 |

\* cited by examiner

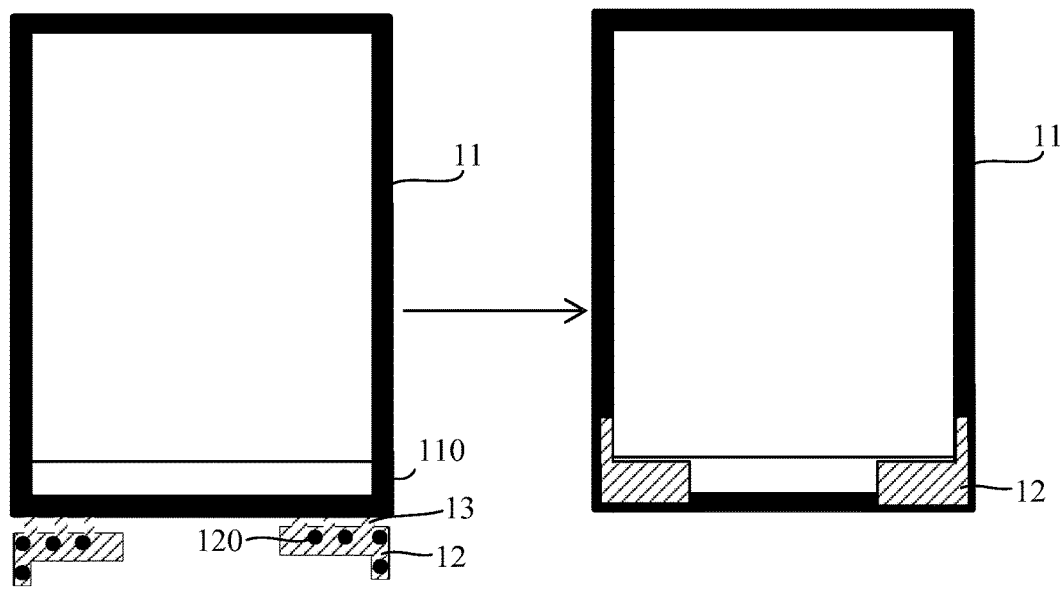
Fig. 4
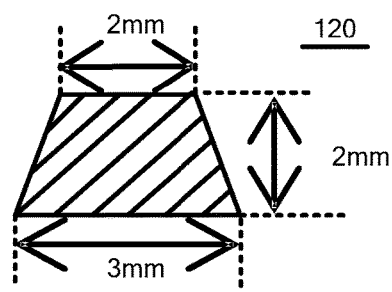
Fig. 5 ( a )
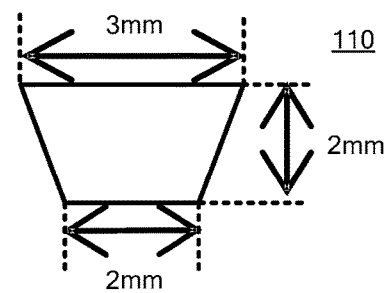
Fig. 5 ( b )

RUBBER FRAME AND MANUFACTURING METHOD THEREOF, BACKLIGHT MODULE, AND DISPLAY DEVICE AND ASSEMBLING METHOD THEREOF

The application is a U.S. National Phase Entry of International Application No. PCT/CN2016/092700 filed on Aug. 1, 2016, designating the United States of America and claiming priority to Chinese Patent Application No. 201610006101.9, filed on Jan. 5, 2016. The present application claims priority to and the benefit of the above-identified applications and the above-identified applications are incorporated by reference herein in their entirety.

TECHNICAL FIELD

Embodiments of the present disclosure relate to a rubber frame and a manufacturing method thereof, a backlight module, and a display device and an assembling method thereof.

BACKGROUND

Currently, portable products, such as smartphones and the like, are becoming thinner, brighter and lower in power consumption. For products employing liquid crystal display panels, such as cellphones or the like, metal backplates are removed from their backlight module to realize thinner products at present, but this will result in a degradation of an overall structural strength of the products.

SUMMARY

Embodiments of the present disclosure provide a rubber frame and a manufacturing method thereof, a backlight module, and a display device and an assembling method thereof, so as to solve the problem that breakage is prone to occur at a position with single-layer glass (sheet).

An embodiment of the present disclosure provides a rubber frame, which comprising a rubber frame body and a protective structure member providing cushioning effect; the protective structure member is in a shape of sheet and made of a same material as that of the rubber frame body, and is configured in cooperation with the rubber frame body within a bonding region of the rubber frame body.

For example, the protective structure member can be connected to an edge of the rubber frame body at a side corresponding to the bonding region.

For example, the protective structure member and the rubber frame body are integrally formed.

For example, the rubber frame can further comprise a connection structure, and the protective structure member is connected to the edge of the rubber frame body through the connection structure, and during the assembly process, the protective structure member is bonded onto a display panel after being bent.

For example, a surface, which is bonded with an upper surface of the rubber frame body, of the protective structure member can be provided with a protrusion, and a corresponding position of the upper surface of the rubber frame body can be provided with a mounting hole for accommodating the protrusion.

For example, the protrusion can be a conical shaped structure; the mounting hole can be an inverted conical shaped structure corresponding to the protrusion.

For example, a number of the protective structure members can be two, and after being assembled, the protective structure members are attached onto an upper surface of two corners of the rubber frame body at a side corresponding to the bonding region.

For example, the protective structure member can be L-shaped, and can correspond to a right angle of the rubber frame body when being assembled.

Another embodiment of the present disclosure provides a backlight module, which comprising any one of the above rubber frames.

Further another embodiment of the present disclosure provides a display device, which comprising any one of the above the rubber frames or the above backlight module.

Further another embodiment of the present disclosure provides a method for assembling a display device, which comprising a operation of providing a protective structure member providing cushioning effect in a bonding region of the rubber frame in a process of assembling a display panel and a rubber frame; the protective structure member is in a shape of sheet and is made of a same material as that of the rubber frame body.

For example, the protective structure member can be connected to an edge of the rubber frame body through a connection structure, and during the assembly process, the protective structure member is bonded onto the display panel after being bent upward.

For example, the protective structure member can be provided with a protrusion, and a corresponding position of the rubber frame body can be provided with a mounting hole, the assembling method can further comprising: assembling the protrusion into the mounting hole of the rubber frame body.

For example, further, after the display panel and the rubber frame being assembled, the assembling method further comprising performing an edge-cutting process to remove the connection structure.

Further another embodiment of the present disclosure provides a method for manufacturing any one of the rubber frames; the rubber frame body and the protective structure member are integrally formed.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 4 is a schematic view of assembling a protective structure member provided by an embodiment of the present disclosure;

FIG. 5 (a) is a schematic view showing a design of a protrusion on a protective structure member of an embodiment of the present disclosure;

FIG. 5 (b) is a schematic view showing a design of a mounting hole in a rubber frame of an embodiment of the present disclosure.

REFERENCE NUMERALS

10—display panel, 20—touch screen, 30—gap, 11—rubber frame body, 12—protective structure member, 13—connection structure, 110—mounting hole, 120—protrusion, 111—a bonding region of the rubber frame body, 101—a bonding region of an array substrate of a display panel.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
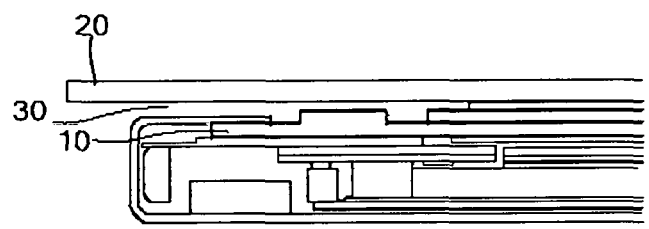
FIG. 1 is a schematically structural cross-sectional view of a display device.

A liquid crystal display panel comprises an array substrate and an opposing substrate (for example, a color filter substrate) arranged opposite to each other, and the array substrate is provided with a bonding region so as to connect with an external driving circuit. As illustrated in FIG. 1, due to the existence of the bonding region, the array substrate extends out of the color filter substrate by a certain distance to expose the bonding region for bonding a flexible printed circuit (FPC). In order to form a touch display panel, the liquid crystal display panel can be additionally attached with a touch screen. However, because the array substrate extends beyond the color filter substrate by a certain distance, only the array substrate is present at the side of the display panel 10 with the bonding region (also referred to as a single-layer glass side) after the touch screen 20 being attached onto the display panel 10. Other regions, where both the array substrate and the color filter substrate are present, are referred to as a double-layer glass region. The single-layer glass side has a lower position compared with the double-layer glass region, thus a large gap 30 is existed between the touch screen 20 and the display panel 10 at the single-layer glass side, so that an overall strength of the display panel 10 is lowered. The single-layer glass side is prone to suffer from deformation, which can result in breakage, during a drop test, that is to say, products (such as, cellphones) employing the above touch display panels are susceptible to damages when dropped.

Namely, for the above touch display device, a large gap exists between the cover board and the touch display panel, and the single-layer glass position is prone to suffer from breakage.

Embodiments of the present disclosure provide a rubber frame, a manufacturing method thereof, a backlight module, and a display device and an assembling method thereof so as to solve the problem that the single-layer glass position is suffered from breakage.

Figure 2:
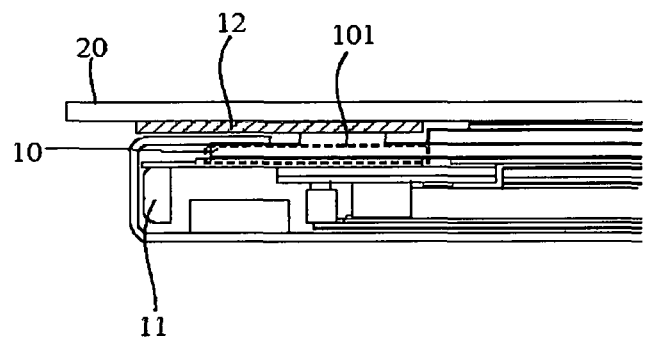
FIG. 2 is a schematically structural cross-sectional view of a display device and a rubber frame provided by an embodiment of the present disclosure.

An embodiment of the disclosure provides a rubber frame, as illustrated in FIG. 2, the rubber frame comprises a rubber frame body 11 and a protective structure member 12 providing a cushioning effect, the protective structure member 12 is in a shape of sheet, is made of a same material as that of the rubber frame body 11 and is used in cooperation with the rubber frame body 11 within a bonding region of the rubber frame body 11.

It should be noted that the rubber frame and the rubber frame body of the embodiment are general designations for specific structural members and do not constitute an limitation to the members in material.

The rubber frame in the present embodiment is provided with a protective structure member 12 used in cooperation with its rubber frame body 11, and during an assembly process, the protective structure member 12, is provided above the position corresponding to the bonding region of the rubber frame body 11, and provided between the rubber frame body 11 and the touch screen (or between the rubber frame body 11 and the cover board), so as to narrow the gap therebetween, the protective structure member 12 functions as a cushion during drop or collision and thus can effectively solve the problem that the single-layer glass position is prone to suffer from breakage.

The structure of the rubber frame body 11 provided by the present embodiment is similar to that of the rubber frame body of a conventional liquid crystal display panel, except that the rubber frame body 11 provided by the present embodiment is provided with a protective structure member 12 at the side corresponding to the bonding region (the left end in FIG. 2), and the protective structure member 12 provides a protective effect. A material to fabricate the protective structure member 12 is required to have elasticity, and is preferably the same as the material of the rubber frame body 11, the thickness of the protective structure member 12 can be determined based on the gap between the rubber frame body and the touch screen (or the gap between the rubber frame body and the cover board), for example, matching with or equal to the gap, in this way, not only the gap between the display panel 10 and the touch screen 20 at the single-layer glass position is narrowed or avoided, but also the difference between the force applied to the single-layer glass side and the force applied to the double-layer glass region is decreased. In the case that the display panel employing the rubber frame provided by the present embodiment is subjected to collision or drop, the external force can be dispersed throughout the entire panel, so that better cushioning effect is achieved.

For example, the protective structure member 12 is connected with an edge of the rubber frame body 11 at the side corresponding to the bonding region and attached onto the rubber frame body 11, and in the process of fabrication, the protective structure member 12 and the rubber frame body 11 are integrally formed; alternatively, the protective structure member 12 can also be separately formed in advance and then assembled onto an upper surface of the rubber frame body 11 at the side corresponding to the bonding region, the assembly methods include, but not limited to, wedging connection, snap-fitting, bonding or the like.

Because the rubber frame body and the protective structure member provided by the present embodiment are integrally formed, the fabrication process can be simplified. In the assembly process, firstly, the display panel can be assembled; and then the display panel is assembled with the rubber frame, this assembly procedure comprises a step of mounting a protective structure member providing a cushioning effect in the bonding region of the rubber frame, for example, and the protective structure member is in a shape of sheet and is made of a same material as that of the rubber frame body.

The present embodiment provides the above protective structure member 12 at a location of the rubber frame body 11 at the side corresponding to the bonding region, thus the problem that the single-layer glass position is prone to suffer from breakage can be effectively solved.

With the novel rubber frame structure and its assembling method provided by the embodiment of the present disclosure, it is possible to improve the protection capability at the single-layer glass position of a panel, so as to prevent the occurrence of breakage, improve the product performance, and reduce the product costs. The rubber frame of the present embodiment is suitable for the assembling of a display panel and a touch display module (i.e., Touch-LCM module), and is also suitable for the assembling of a cover board and a built-in touch display panel, however, the present embodiment is not limited these cases.

An embodiment of the present disclosure further provides a backlight module, which comprises any one of the above-described rubber frames, the backlight module can effectively solve the problem that the single-layer glass position is prone to suffer from breakage, the backlight module is not only applicable to a liquid crystal television and a liquid crystal display device, but also can be used in a display devices that includes a backlight, such as a digital photo frame, an electronic paper, a cellphone or the like.

An embodiment of the present disclosure also provides a display device, which comprises any one of the above-described rubber frames, or the above-described backlight module which comprises any one of the above-described rubber frames. Because the display device employs the backlight module or the rubber frame provided by the present disclosure, in view of the previous description, the display device provided by the present embodiment has a stable structure without the problem that the single-layer glass position is prone to suffer from breakage. For example, the display device can be any product or component having a display function, such as a liquid crystal panel, OLED, an electronic paper, a cellphone, a tablet, a television, a display screen, a notebook, a digital photo frame, a navigator or the like.

In the following, a detailed description of the present disclosure will be given with reference to concrete embodiments.

Figure 3:
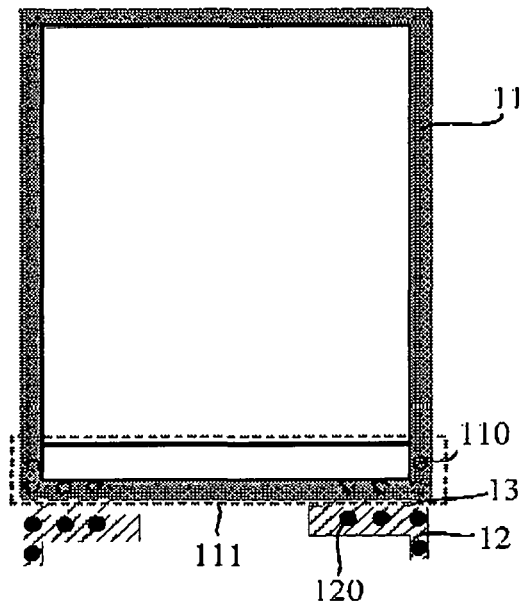
FIG. 3 is a structural schematic plan view of a rubber frame provided by an embodiment of the present disclosure.

The rubber frame structure of the present embodiment employs the design as illustrated in FIG. 3. Two protective structure members 12 are added at an edge of the rubber frame body 11 at a side corresponding to a bonding region, and the protective structure members 12 are connected to the edge of the rubber frame body 11 through connection structures 13. After assembling, the two protective structure members 12 are attached respectively to the upper surfaces of two corners of the rubber frame body 11 at the side corresponding to the bonding region (i.e., corresponding to the left and right corners at the lower rubber frame edge of the rubber frame body 11, as illustrated in FIG. 4); the protective structure members 12, the connection structures 13 and the rubber frame body 11 are integrally formed as a whole by way of injection molding. For example, the connection structures 13 can be thin in thickness and can have a bendable property, and can be of a flexible connection structure. Of course, the connection structures 13 can also be formed as a non-bendable rigid structure, such connection structures 13 can be soft and have a bendable property through treatment such as heating in the process of bending and become rigid after being bent; the connection structures 13 can also be directly formed as a rigid bent structure, that is, a structure that is directly bent onto the upper surface of the rubber frame body 11.

For example, the protective structure member 12 is L-shaped, and corresponds to a right angle of the rubber frame body 11 when being assembled. The transversal portion of the L-shaped protective structure member 12 corresponds to the lower rubber frame edge as illustrated in FIG. 4 and the vertical portion of the L-shaped protective structure member 12 corresponds to the left rubber frame edge or the right rubber frame edge as illustrated in FIG. 4, so as to provide a more stable mounting surface for the touch display panel mounted thereon.

The surface, which is bonded with an upper surface of the rubber frame body 11, of the protective structure 12 is further provided with a protrusion or protrusions 120, and the corresponding position of the upper surface of the rubber frame body 11 is provided with a mounting hole(s) 110 for accommodating the protrusion(s) 120. In the case of being used, as illustrated in FIG. 4, the protective structure member 12 is bent upward till the protective structure member 12 is over the upper surface of the rubber frame body 11, a force is applied so that the protrusion(s) 120 on the protective structure member 12 is accommodated by the mounting hole(s) 110. The protective structure member 12 is attached onto the upper surface of the rubber frame body 11, which corresponds to an increase in thickness of the rubber frame body 11 herein, thus the gap between the upper surface of the rubber frame body 11 and the touch screen 20 (or the cover board) can be narrowed.

The protrusion(s) 120 is used in cooperation with the mounting hole(s) 110, and the number and the design size thereof correspond to each other respectively. In the rubber frame of the present embodiment as illustrated in FIG. 3, the protective structure member 12 is provided with four protrusions 120 having a conical structure; the mounting holes 110 are in one-to-one correspondence with the protective structure members 12, and there are also four mounting holes 110, the external form of the mounting holes 110 and the protrusion 120 correspond to each other, and the mounting holes 110 have an inverted conical structure. In one example, a dimension of the above structures is illustrated in FIG. 5(a) and FIG. 5(b), the protrusions 120 have a diameter of 3 mm at their lower bottom surfaces, and a diameter of 2 mm at their upper bottom surfaces; the mounting holes 110 have a diameter of 2 mm at their lower bottom surfaces, and a diameter of 3 mm at their upper bottom surfaces.

Figure 6:
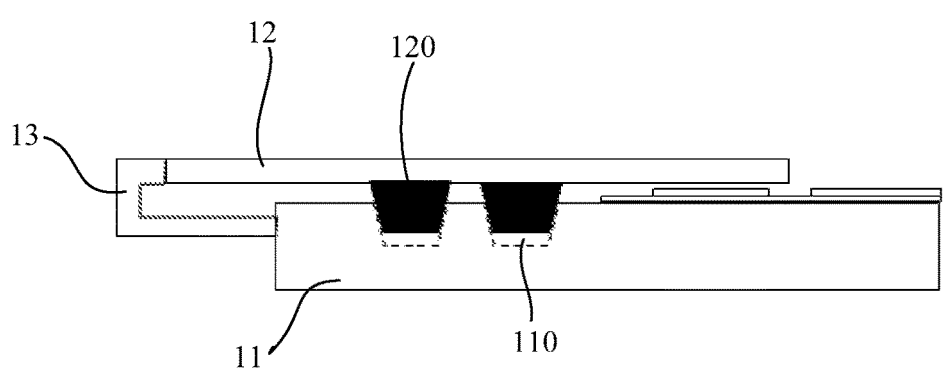
FIG. 6 is a schematically structural cross-sectional view of a rubber frame, with a protective structure member being assembled, provided by an embodiment of the present disclosure.

As illustrated in FIG. 6, when the assembling of the display panel 10 is completed, the protective structure member 12 is bent, positioning and fixation is realized by the conical protrusions 120 and the mounting holes 110. The protective structure member 12 is attached onto the upper surface of the rubber frame body 11 so as to protect the single-layer glass position. Then the assembling process continues, after the touch screen 20 is attached, the gap between the display panel 10 and the touch screen at the single-layer glass position is narrowed, and here a protective structure member 12 is provided therebetween for providing a cushioning effect.

Furthermore, due to the conical structure design of the protrusion 120, it is possible not only prevent the problem that breakage occurs when the display product is subjected to forward drop, but also prevent the problem that breakage occurs when the product is subjected to backward drop and thus the large amount of deformation of the touch screen presses the single-layer glass position.

Further, after the step of assembling the display panel with the rubber frame, the above method for assembling the display device can further comprise performing an edge-cutting process to remove the connection structure 13. Removing the peripheral portion can create an effect of narrow bezel.

Various embodiments of the present specification are described in a progressive manner, with identical and similar parts between the various embodiments being referred to each other, and the description of each embodiment is focus on the differences between the embodiments. In particular, because the method embodiment is substantially similar to the device embodiment, the description of the method embodiment is relatively simple, and the related aspects of the method embodiment can refer to part of the descriptions of the method embodiment.

What are described above is related to the illustrative embodiments of the disclosure only and not limitative to the scope of the disclosure; the scopes of the disclosure are defined by the accompanying claims.

The application claims priority to the Chinese patent application No. 201610006101.9, filed Jan. 5, 2016, the entire disclosure of which is incorporated herein by reference as part of the present application.

What is claimed is:

1. A rubber frame, comprising a rubber frame body and a protective structure member providing a cushioning effect for a touch screen, wherein
the protective structure member is provided with a connection structure and located between the touch screen and the rubber frame body in a shape of sheet and made of a same material as that of the rubber frame body, and the protective structure member is L-shaped and disposed on a surface of a bonding region of the rubber frame body and is configured in cooperation with a right angle of each corner of the rubber frame body; and a thickness of the protective structure member is equal to a spacing between the touch screen and the rubber frame body; and
a surface, which is bonded with an upper surface of the rubber frame body, of the protective structure member is provided with a protrusion, and a corresponding position of the upper surface of the rubber frame body is provided with a mounting hole for accommodating the protrusion.

2. The rubber frame according to claim 1, wherein the protective structure member is connected to an edge of the rubber frame body at a side corresponding to the bonding region.

3. The rubber frame according to claim 2, wherein the protective structure member and the rubber frame body are integrally formed.

4. The rubber frame according to claim 2, wherein the protective structure member is connected to the edge of the rubber frame body through the connection structure, and the connection structure is configured to be bent during an assembly process to allow the protective structure member to be bonded onto the rubber frame body and a display panel.

5. The rubber frame according to claim 1, wherein the protrusion is a conical shaped structure, and the mounting hole is an inverted conical shaped structure corresponding to the protrusion.

6. The rubber frame according to claim 1, comprising two protective structure members, and after being assembled, the protective structure members are attached onto an upper surface of two corners of the rubber frame body at a side corresponding to the bonding region.

7. A backlight module, comprising the rubber frame according to claim 1.

8. A display device, comprising the rubber frame according to claim 1.

9. A method for assembling a display device, comprising:
assembling a display panel and a rubber frame, wherein the rubber frame comprises a rubber frame body and a protective structure member providing a cushioning effect for a touch screen; and
in a process of assembling the display panel and the rubber frame, bonding a surface of the protective structure member onto a surface by engaging a protrusion on the protective structure member and a mounting hole on an upper surface of the rubber frame body, which is adjacent to a bonding region of an array substrate of the display panel, of the rubber frame body, wherein the protective structure member is an L-shaped sheet and is made of a same material as that of the rubber frame body; and a thickness of the protective structure member is equal to a spacing between the touch screen and the rubber frame body.

10. The method according to claim 9, wherein the protective structure member is connected to an edge of the rubber frame body through a connection structure, and, during an assembly process, the protective structure member, after being bent upward, is bonded onto the display panel.

11. The method according to claim 10, further comprising: performing an edge-cutting process to remove the connection structure after the protective structure member has been bonded onto the display panel.

12. A method for manufacturing the rubber frame according to claim 1, comprising forming the rubber frame body and the protective structure member integrally.

13. A display device, comprising the backlight module according claim 7.

14. A display device, comprising: a touch screen, a rubber frame, and an array substrate, wherein
the rubber frame comprises a rubber frame body and a protective structure member providing a cushioning effect;
the protective structure member is provided with a connection structure and located between the touch screen and the rubber frame body in a shape of sheet and made of a same material as that of the rubber frame body; and
the protective structure member is L-shaped and disposed on a surface, which is adjacent to a bonding region of the array substrate, of the rubber frame body, and is configured in cooperation with a right angle of each corner of the rubber frame body; and a thickness of the protective structure member is equal to a spacing between the touch screen and the rubber frame body; and
a surface, which is bonded with an upper surface of the rubber frame body, of the protective structure member is provided with a protrusion, and a corresponding position of the upper surface of the rubber frame body is provided with a mounting hole for accommodating the protrusion.

15. The display device according to claim 14, wherein the protrusion is a conical shaped structure and the mounting hole is an inverted conical shaped structure corresponding to the protrusion.

\* \* \* \* \*